(12) United States Patent
Piepenbrink et al.

(10) Patent No.: US 9,516,103 B2
(45) Date of Patent: *Dec. 6, 2016

(54) MANAGING LINEAR MULTIMEDIA CONTENT DELIVERY

(71) Applicant: AT&T Intellectual Property I, L.P., Atlanta, GA (US)

(72) Inventors: David J. Piepenbrink, Chicago, IL (US); Lee M. Chow, Naperville, IL (US); James T. Sofos, Aurora, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,401

(22) Filed: Oct. 5, 2015

(65) Prior Publication Data

US 2016/0028800 A1   Jan. 28, 2016

Related U.S. Application Data

(63) Continuation of application No. 12/507,027, filed on Jul. 21, 2009, now Pat. No. 9,154,331.

(51) Int. Cl.
| | |
|---|---|
| *H04L 29/08* | (2006.01) |
| *H04L 12/46* | (2006.01) |
| *H04L 12/18* | (2006.01) |
| *H04L 12/26* | (2006.01) |
| *H04L 12/803* | (2013.01) |
| *H04L 29/06* | (2006.01) |

(52) U.S. Cl.
CPC ......... *H04L 67/1008* (2013.01); *H04L 12/185* (2013.01); *H04L 12/4679* (2013.01); *H04L 43/0882* (2013.01); *H04L 47/125* (2013.01); *H04L 65/4076* (2013.01)

(58) Field of Classification Search
CPC ............. H04L 67/1008; H04L 12/185; H04L 65/4076; H04L 47/125; H04L 43/0882
USPC ........................................................ 709/221
See application file for complete search history.

(56) References Cited

U.S. PATENT DOCUMENTS

| | | |
|---|---|---|
| 6,597,956 B1 | 7/2003 | Aziz et al. |
| 7,414,960 B2 | 8/2008 | Geile et al. |
| 7,627,501 B2 | 12/2009 | Bagsby et al. |
| 7,631,325 B2 | 12/2009 | Rys et al. |
| 7,743,132 B2 | 6/2010 | Tewari et al. |
| 7,761,534 B2 | 7/2010 | Ehrich et al. |
| 7,770,200 B2 | 8/2010 | Brooks et al. |
| 7,779,071 B2 | 8/2010 | Lor et al. |
| 7,818,355 B2 | 10/2010 | Mills et al. |
| 7,840,667 B2 | 11/2010 | Weller et al. |
| 2004/0015986 A1 | 1/2004 | Carver et al. |
| 2007/0097860 A1 | 5/2007 | Rys et al. |
| 2007/0101351 A1 | 5/2007 | Bagsby et al. |
| 2007/0250880 A1 | 10/2007 | Hainline |
| 2008/0072264 A1 | 3/2008 | Crayford |
| 2008/0168487 A1 | 7/2008 | Chow et al. |

(Continued)

*Primary Examiner* — Suraj Joshi
(74) *Attorney, Agent, or Firm* — Jackson Walker L.L.P.

(57) ABSTRACT

Users are assigned to virtual groups. Virtual groups are associated with server assets. Achieving load-balancing during the delivery of linear multimedia content, for example, may be achieved through reassigning users to different virtual groups. Server assets can include server clusters that are assigned to the virtual groups. New hardware can be added to server assets without having to directly associate users to the new hardware.

20 Claims, 5 Drawing Sheets

(56) References Cited

U.S. PATENT DOCUMENTS

| | | |
|---|---|---|
| 2008/0235101 A1 | 9/2008 | Piepenbrink et al. |
| 2008/0235104 A1 | 9/2008 | Chow et al. |
| 2008/0235278 A1 | 9/2008 | Piepenbrink et al. |
| 2009/0119696 A1 | 5/2009 | Chow et al. |
| 2009/0119703 A1 | 5/2009 | Piepenbrink et al. |
| 2009/0132383 A1 | 5/2009 | Piepenbrink et al. |
| 2009/0164316 A1 | 6/2009 | Piepenbrink et al. |
| 2009/0201929 A1 | 8/2009 | Patel |
| 2009/0222335 A1 | 9/2009 | Gopal et al. |
| 2009/0228588 A1 | 9/2009 | Swildens et al. |
| 2009/0328109 A1 | 12/2009 | Pavlovskaia et al. |
| 2010/0115627 A1 | 5/2010 | Chow et al. |
| 2010/0122280 A1 | 5/2010 | Sofos et al. |
| 2010/0124399 A1 | 5/2010 | Sofos et al. |
| 2010/0125866 A1 | 5/2010 | Sofos et al. |
| 2010/0125867 A1 | 5/2010 | Sofos et al. |
| 2010/0138855 A1 | 6/2010 | Sofos et al. |
| 2010/0146607 A1 | 6/2010 | Piepenbrink et al. |
| 2010/0150521 A1 | 6/2010 | Chow et al. |
| 2010/0162319 A1 | 6/2010 | Piepenbrink et al. |
| 2010/0162342 A1 | 6/2010 | Piepenbrink et al. |
| 2010/0162363 A1 | 6/2010 | Piepenbrink et al. |
| 2010/0251280 A1 | 9/2010 | Sofos et al. |
| 2010/0262645 A1 | 10/2010 | Brown et al. |
| 2010/0290761 A1 | 11/2010 | Drake et al. |
| 2010/0319048 A1 | 12/2010 | Ahmed et al. |
| 2011/0041147 A1 | 2/2011 | Piepenbrink et al. |
| 2011/0041148 A1 | 2/2011 | Piepenbrink et al. |
| 2011/0041149 A1 | 2/2011 | Piepenbrink et al. |

MANAGING LINEAR MULTIMEDIA CONTENT DELIVERY

This application is a continuation of U.S. patent application Ser. No. 12/507,027, filed Jul. 21, 2009, issuing as U.S. Pat. No. 9,154,331 on Oct. 6, 2015, the entirety of which is incorporated by reference herein.

BACKGROUND

1. Field of the Disclosure

The present disclosure relates to managing the delivery of multimedia content and, more particularly, to load-balancing server assets that provide linear multimedia content.

2. Description of the Related Art

Multimedia content distribution networks (MCDNs) provide linear multimedia content to users. When delivering the linear multimedia content to a user or group of users, an administrator may use hardware switches to select which server assets will deliver the content.

DESCRIPTION OF EXEMPLARY EMBODIMENTS

Figure 1:
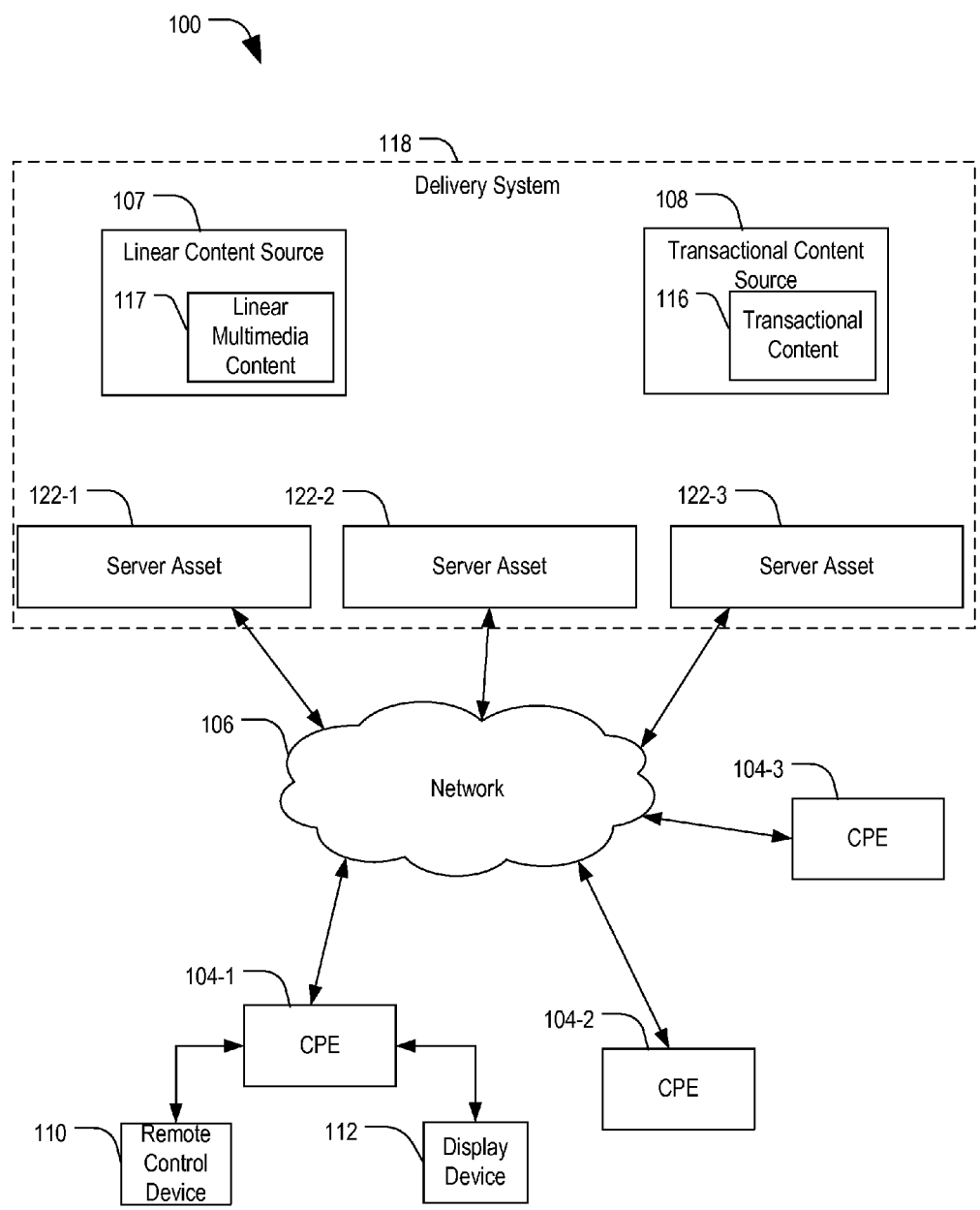
FIG. 1 is a block diagram of selected elements of an embodiment of an MCDN.

In one aspect, a disclosed method relates to providing multimedia programs and includes grouping server assets into virtual groups, monitoring loading of the grouped server assets, and assigning a client device to one of the virtual groups based on a load parameter for the grouped server assets for the virtual group. A client device (e.g., set-top box (STB)) is assigned to a virtual group and can receive multimedia content from server assets associated with the virtual group. A request to receive a multimedia program, which may include linear multimedia content, is received from the assigned client device. A plurality of multimedia frames of the multimedia program are provided from server assets associated with the same virtual group as the client device. The assigned client device is also directed to a multicast replicator for receiving further frames of the requested multimedia program. In accordance with disclosed embodiments, the client device may be assigned to a different virtual group in response to a change in the monitored loading of the virtual groups.

In certain embodiments, the multimedia program includes linear content. Disclosed methods can also include incrementing a counter indicative of a number of client devices served by grouped server assets (i.e., server assets assigned to a virtual group). The method may include caching a plurality of multimedia frames from a multimedia program at a server asset associated with a virtual group. Additionally, some disclosed methods include sending to the client device an identifier (e.g., a network address) for the server asset. Sending the identifier to the client device may be in response to a timer or booting up of the client device. In some embodiments, sending the identifier to the client device is staggered with respect to sending identifiers to other client devices.

In a further aspect, a disclosed system for distributing linear multimedia content to a plurality of users includes a plurality of physical server assets. The physical server assets distribute the linear multimedia content to a plurality of client devices associated with the plurality of users. Individual physical server assets of the plurality of physical server assets include a load capacity level. A plurality of virtual groups in disclosed systems is individually associated with physical server assets of the plurality of physical server assets. Disclosed systems include a load balancer for assigning portions of the plurality of client devices to a virtual group. The load balancer assigns client devices to virtual groups based at least in part on load capacity levels for the physical server assets associated with the respective virtual groups. The load balancer in some disclosed systems can reassign client devices based on a revised load capacity level for one or more of the plurality of physical server assets. Reassigning client devices may be in response to a technical failure of one or more of the physical server assets or may be performed to distribute (e.g., balance) workloads between grouped server assets.

In yet another aspect, a disclosed computer readable media is embedded with computer readable instructions for balancing workload between a plurality of server assets that can distribute linear multimedia content. In some embodiments, embedded instructions enable a data processing system (e.g., a computer) to assign a plurality of users to a virtual group selected from a plurality of virtual groups. Server assets are assigned to the virtual group to deliver multimedia content to the users assigned to the virtual group. Selection of users to be assigned to the virtual group is based at least in part on a load balance parameter associated with the virtual group or the server assets associated with the virtual group. Further instructions enable a data processing system to send an indication (e.g., a network address) of the server asset to client devices associated with the virtual group.

In certain embodiments, further instructions enable a data processing system to assign a portion of the plurality of server assets to the virtual group to result in a portion of the plurality of server assets distributing the linear multimedia content to a portion of the client devices. The server asset may be, for example, a D-server that unicasts multimedia content to users after a channel change. Further instructions enable a data processing system to receive requests for linear multimedia content from client devices and stream (e.g., unicast) a portion of the requested linear multimedia content to the client device. Further portions of the requested linear multimedia content may be provided through a multicast stream from a multicast replicator, for example. In some embodiments, further instructions enable a data processing system to align the multicast stream with the unicast stream to provide a seamless transition, as perceived by the user while viewing the multimedia content, from the server asset (e.g., a D-server) to the multicast replicator.

In some embodiments, client devices are provided access to or sent an identifier of the server assets that are assigned to the client devices. If the assignment is changed, for example to achieve load-balancing among server assets, the client device can be sent or provided access to an updated identifier. The updated identifier may be sent to the client device in response to a timer (e.g., every 6 hours), at a predetermined time (e.g., 2 AM each day), or in response to booting up the client device, as examples. In some embodiments, computer readable instructions enable a data processing system to monitor the workload or an amount of traffic associated with requests for linear multimedia content. Such monitoring can include, for example, measuring respective traffic amounts for each of a plurality of server assets. Reassigning client devices to different virtual groups, and consequently reassigning the client devices to different server assets, may be based at least in part on comparing measured traffic amounts with the load balance parameter for relevant server assets.

As background regarding multimedia content delivery, multimedia content (e.g., a television program) is often provided to users (e.g., to a user's client device) by service providers that provide access to the content over private networks. Such private networks may for example, include satellite networks, fiber optic networks, coaxial networks or a combination of such networks. The service provider may issue customer premises equipment (CPE) such as an STB to users for accessing multimedia content over the private networks. When a user wishes to obtain multimedia content, the STB or other CPE issued by the service provider may authenticate with the service provider network and allow the user access to specified or requested multimedia content. Some service providers transmit multimedia content, including linear multimedia content, to data processing systems (e.g., smart phones, car entertainment systems, etc.) that are not issued by the service provider. Additionally, service providers may transmit such multimedia content over public networks. The transmission of the multimedia content may include transmission of the multimedia content and related data over Internet protocol (IP) networks. Service providers may operate digital television networks that use IP protocols, for example.

In some digital television networks, at least two types of servers are used to provide multimedia content to client devices (e.g., STBs). Specifically, A-servers and D-servers are used. In some digital television networks the number of A-servers scale with channels and D-servers scale with subscribers. Moreover, there may be more D-servers than A-servers. Use of two server types assists in reducing latencies involved with channel changes. In some disclosed systems, server assets used to provide requested multimedia content include D-servers. These D-servers may sit at the edge of a provider network and cache image frames of multimedia programs. For example, D-servers may be in a central office or digital subscriber line access multiplexer (DSLAM). Upon a channel change by a user, the D-server provide frames to the client devices from a cache. In some embodiments which transmit nonlinear multimedia content, the frames are provided at an accelerated feed rate (e.g., 1.3× a normal rate) to assist the client device in preventing underflow problems. In response to a timer, in response to a trigger condition, or to improve network efficiency, a client device may request to join a simulcast from an A-server. While receiving and viewing linear multimedia content, client devices are preferably provided seamless transfers from D-server unicasts to A-server simulcasts.

Multimedia content may include linear multimedia content and nonlinear multimedia content. An example of nonlinear content is video on demand (VOD) content which may be stored by an MCDN and distributed to client devices as needed. For example, in response to a user request to receive a VOD movie, an MCDN can stream the VOD movie or provide the VOD movie for download to the user for later viewing. If the VOD movie is nonlinear content, the user may fast-forward, rewind, or otherwise affect parameters during streaming the VOD movie to the user's CPE device.

An example of linear multimedia content is live television streamed or transmitted from a television network (e.g., from a so-called major broadcast television network) to an acquisition tier of an MCDN, and then streamed to a user's CPE device that is communicatively coupled to the MCDN's delivery system (e.g., server assets). For example, a football game may be broadcast live or with a short delay, and may therefore include linear multimedia content. When a user of a client device requests such linear multimedia content, the user's client device (e.g., STB) may access a so-called user store on the client device to determine a network address of server assets from which to request the linear multimedia content from the MCDN. The user store may include identifiers for the server assets (e.g., a hardware identification number) that are used by the MCDN for authentication and may also include addresses (e.g., network addresses) used by the client device for accessing multimedia content. In some embodiments, the user store may include a network address for a D-server that distributes requested linear multimedia content to the client device. The user store at the client device can include information indicative of a virtual group to which the client device is assigned. The user store may also include information indicative of the server assets from which the client device should seek requested multimedia content.

In managing delivery of requested multimedia content to client devices, embodied systems and methods assign users or the client devices of users to virtual groups. The virtual groups are associated with server assets (e.g., one or more D-servers or server clusters). Users can be assigned and dynamically reassigned to different virtual groups, in accordance with disclosed embodiments, to achieve balance workloads for the server assets. Some disclosed systems can statically or semi-statically assign CPE to virtual groups and minimize the overhead associated with reassignments. During operation, additional server assets may be associated with a virtual group without requiring an administrator to assign a user member of the virtual group to the additional server assets. In the event of a technical failure or as required to achieve balanced workloads among server assets, users may be reassigned to different virtual groups, and therefore to different server assets.

In some embodied systems and methods, the client device is notified of such reassignments by an update to the client device's user store. The user store for the client device may store network identifiers for a server asset or assets that deliver multimedia content to the client device. The user store can be stored locally (e.g., at the user premises) in memory that is within or coupled to the client device. An MCDN can push an indication of a reassignment to the user store to update the client device upon a predetermined trigger (e.g., an assignment to a different virtual group), after a client device boot up, according to a timer (e.g., every six hours), periodically (e.g., daily), at predetermined times, or in response to a request by the client device, as examples.

As an example, an administrator (e.g., a software application) determines that a user or group of users should be reassigned to a different virtual group, and therefore reassigned to different server assets, to achieve load-balancing among the server assets or virtual groups. Transferring the user or users to a new virtual group triggers an MCDN component to update the user stores of affected client devices. Alternatively, the client device can request any updates needed to its user store according to a predetermined schedule. In accordance with some disclosed embodiments, the updated user store may include an identifier (e.g., network address) for a different server asset.

Figures that relate to some disclosed systems are described below. In the figures and in the text of this disclosure, details are set forth by way of example to enable one of ordinary skill in the art to practice the claimed subject matter without undue experimentation. It should be apparent to a person of ordinary skill that disclosed embodiments are examples and not exhaustive of all possible embodiments. Regarding reference numerals used to describe elements in the figures, a hyphenated form of a reference numeral refers to a specific instance of an element and the un-hyphenated form of the reference numeral refers to the element generically or collectively. Thus, for example, element "CPE device 104-1" refers to an instance of a CPE device, which may be referred to collectively as CPE devices 104, and any one of which may be referred to generically as a CPE device 104.

FIG. 1 is a block diagram of a particular illustrative embodiment of system 100 that provides multimedia content (e.g., linear multimedia content) to client devices (e.g., CPE devices 104). System 100 includes linear content source 107 that communicates via server assets 122 and network 106 with CPE 104 (e.g., an STB). As shown, linear content source 107 includes linear multimedia content 117, which in exemplary embodiments includes cached frames of linear multimedia content.

Delivery system 118 provides multimedia content to CPE devices 104. To request multimedia content (e.g., linear multimedia content 117), a user of CPE device 104-1 can operate remote control device 110 to navigate a graphical user interface (a GUI, not depicted) presented on display device 112. In exemplary systems, the GUI contains indications (e.g., titles, pictures, video clips, channel numbers, etc.) to assist the user of CPE device 104-1 to select a linear multimedia program or a channel that provides linear multimedia content. If a user of CPE device 104-1 and remote control device 110 requests a channel change, CPE device 104-1 can access its user store (e.g., server asset 122-3) for a network address of a server asset associated with the requested channel.

The term "server assets," as frequently used herein, can include varied combinations of hardware and software that provide services and content (e.g., linear multimedia content) to users. In some disclosed systems, individual physical server assets include server clusters. CPE devices 104 may be assigned to one or more server assets 122, as a default, for receiving multimedia content from delivery system 118. In accordance with some disclosed embodiments and as shown in FIG. 1, server assets 122 and CPE devices 104-1 can be associated with one or more virtual groups (not depicted) that can be managed using a data processing system (e.g., a desktop computer) to affect and change the assignments of CPE devices 104 to server assets 122.

As part of a delivery management system implemented for delivery system 118, server asset 122-1 may be associated with a first virtual group (not depicted) and server assets 122-2 and 122-3 may be associated with a second virtual group. Likewise, CPE device 104-1 and CPE device 104-2 may be associated with the first virtual group while CPE device 104-3 may be associated with the second virtual group (not depicted). The individual workloads of server assets 122 can be monitored and used to reassign CPE devices 104. Some disclosed systems can statically or semi-statically assign CPE to virtual groups and minimize the number of reassignments. Certain CPE can be designated as statically or semi-statically assigned to a virtual group, while other CPE can be designated as subject to reassignment. In the above example, if server asset 122-1 is overloaded, either CPE device 104-1 or CPE device 104-2 may be reassigned to the second virtual group, and consequently assigned to or associated with some combination of server assets 122-2 and 122-3. If server asset 122-2 is delivering content to one or more of CPE devices 104 and has a technical failure, the CPE devices can be reassigned to server asset 122-3 without intervention by an administrator, as a consequence of both server assets 122-2 and 122-3 being associated with the same virtual group.

New users (i.e., additional CPE devices 104) may be added to a particular virtual group selected to achieve balanced workloads among server assets 122 or selected to achieve balanced workloads as calculated on a per virtual group basis. A load balance parameter may be associated with each server asset 122 or with each virtual group. Additional server assets may be added to virtual groups without an administrator, for example, having to manually associate the users of the virtual group with the added server assets. In this way, enhanced management related to the delivery of multimedia content (e.g., linear multimedia content) may be achieved.

As shown in FIG. 1, delivery system 118 includes transactional content source 108 that stores or otherwise accesses transactional content 116. Transactional content may include assets such as digital wallpaper, movie images, actor images, ring tones, audio clips from media content, downloadable soundtracks, VOD content, soundtrack clips, or any combination thereof. In operation of the system shown in FIG. 1, a server asset (e.g., server asset 122-3) can receive a request from CPE device 104-3 for transactional content (e.g., a VOD movie) over network 106. In this case, CPE device 104-3 requests non-linear multimedia content that is provided over network 106 from transactional content source 108. This nonlinear multimedia content may be provided by one or more components (e.g., a server cluster) of server assets 122 or may be provided by additional server assets, such as VOD servers.

Figure 2:
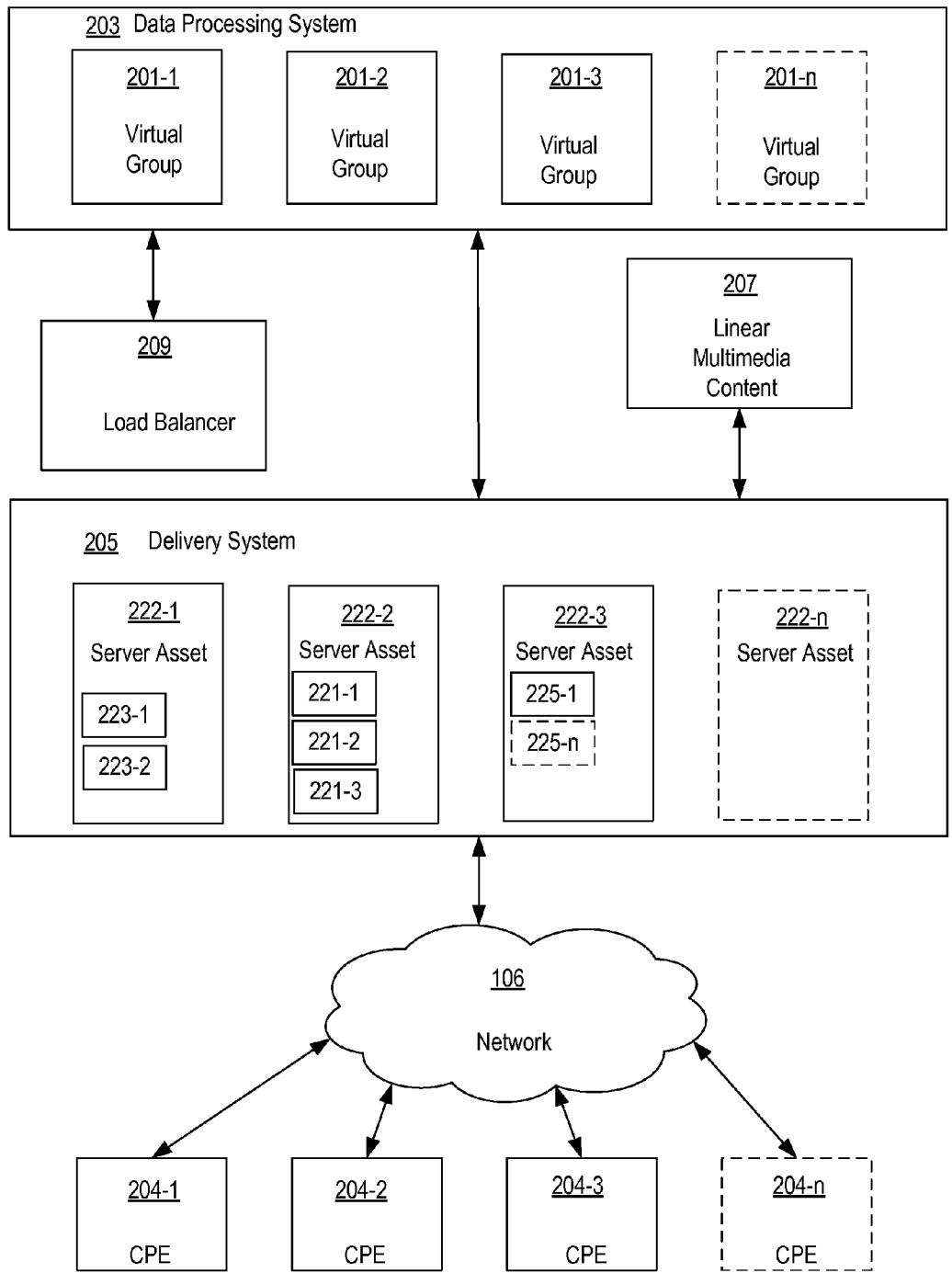
FIG. 2 is a block diagram of selected elements of an embodiment of an MCDN.

FIG. 2 is a block diagram of selected aspects of an MCDN that manages linear multimedia content delivery. Data processing system 203 has access to a memory device (not depicted) that stores executable instructions, such as embodied by a software program. Such software programs can operate to perform one or more of the disclosed embodiments. As shown, data processing system 203 includes virtual groups 201-1 through 201-n. The "n" in the designation "201-n" indicates that a varied or variable number of virtual groups may be associated with data processing system 203. For example, there may be ten virtual groups or there may be three virtual groups, and the number of virtual groups may depend on the preferences of an administrator. Virtual groups may be added or subtracted as needed to achieve any specified linear multimedia content delivery management scheme. Similarly, there may be a varied number of CPE devices 204, and CPE devices (i.e., client devices) may be added or subtracted to individual virtual groups 201 as needed to manage delivery to the CPE devices 204 from server assets 222. Still further, there may be varied numbers of server assets 222 and server clusters 225, as represented by the designations 222-n and 225-n.

As shown in FIG. 2, a plurality of physical server assets 222 distribute multimedia content (e.g., linear multimedia content) to CPE devices 204, which represent a plurality of client devices associated with a plurality of users (e.g., users of an MCDN). Individual physical server assets 222 have load capacity levels which may be different from one another. For example, server asset 222-1 includes server cluster 223-1 and server cluster 223-2. The load capacity level for server asset 222-1 may be calculated by adding the load capacity level for server cluster 223-1 and server cluster 223-2. Similarly, server asset 222-2 includes server clusters 221. Accordingly, the load capacity level for server asset 222-2 may be determined by adding the load capacity levels for server cluster 221-1, server cluster 221-2, and server cluster 221-3.

As shown, virtual groups 201 are a plurality of virtual groups that are individually associated with one or more physical server assets 222. The number of virtual groups 201 is not necessarily correlated to or determined by the number of server assets 222. Load balancer 209 assigns CPE devices 204 to virtual groups 201 so that individual CPE devices are distributed among the virtual groups. The assigning of the CPE devices to the virtual groups is based at least in part on load capacity levels and in some cases traffic levels for the server assets 222 that are assigned to the individual virtual groups. Load balancer 209 can monitor traffic from server assets 222 and requests from CPE devices 204 and reassign client devices to a different virtual group within virtual groups 201. In some embodiments, such reassignments of client devices can also be based on a revised load capacity level for one or more of the server assets 222. For example, in the event of a technical failure of server cluster 223-1, the load capacity for server asset 222-1 and the corresponding virtual group 201 would change and load balancer 209 may reassign CPE devices, and consequently reassign users, to a different virtual group 201. As a result, the reassigned CPE devices are also reassigned to different server assets 222. Some disclosed systems can statically or semi-statically assign CPE to virtual groups and minimize the number of reassignments. In addition, CPE can be designated as statically or semi-statically assigned to a virtual group, while other CPE can be designated as subject to reassignment.

Load balancer 209 may perform elements of an embodied method for providing multimedia programs by grouping or associating server assets 222 into virtual groups 201. For example, virtual group 201-1 may include or be associated with server asset 222-1 and server asset 222-2. Virtual group 201-2 may include or be associated with server asset 223-3. Virtual group 201-3 may include or be associated with other server assets (not depicted). In operation, load balancer 209 can monitor the loading of the grouped server assets, and accordingly monitor the loading of the virtual groups 201, and assign CPE device 204-*n* to one of the virtual groups 201 based on a load parameter for the grouped server assets (i.e., server asset 222-1 and server asset 222-2) for virtual group 201-1.

During operation, delivery system 205 can receive a request from CPE device 204-3 to receive a multimedia program that includes linear multimedia content (e.g., multimedia frames from a live television broadcast). Load balancer 209 may have previously determined that CPE device 204-3 is associated with virtual group 201-2 and therefore served by the server asset 222-1, as an example. Virtual group 201-2 may also be associated with server asset 222-2. In response to the request, server asset 222-1 provides to CPE device 204-3 a plurality of multimedia frames of the requested multimedia program. Server asset 222-1 may include a unicast server (e.g., within server cluster 223-2) that provides an initial portion of the requested multimedia program. Unicasting the initial portion of the requested multimedia program may help facilitate rapid channel changes, in which a user is presented with multi-media content (e.g., linear multimedia content) without excessive latency before frames of the requested multimedia content appear on the user's display device.

While receiving by unicast a portion of the requested multimedia program, delivery system 205 may direct CPE device 204-3 to a multicast replicator (e.g., a multi-cast replicator within server cluster 225-1). From the multicast replicator, CPE device 204-3 is provided further portions of the requested multimedia program. Delivery system 205 or CPE device 204-3 can synchronize the unicast stream and multicast stream to provide a seamless multimedia presentation as viewed and heard by the user of CPE device 204-3.

In operation, load balancer 209 can monitor the individual loads of virtual groups 201 and consequently the loads of server assets 222 associated with each virtual group. If load balancer 209 detects a critical change in the monitored loading of the virtual groups, load balancer 209 may assign CPE device 204-3 or other CPE devices (e.g., CPE device 204-*n*) to a different virtual group (e.g., virtual group 201-3). In some embodiments, load balancer 209 increments a counter indicative of a number of CPE devices (i.e., the number of CPE devices 204) served by each of the grouped server assets.

As shown in FIG. 2, linear multimedia content 207 includes multimedia content that may be requested by users of CPE devices 204. When a client device requests multimedia content included within linear multimedia content 207, the server asset assigned to the virtual group associated with the client device may cache portions of the requested multimedia content.

Upon load balancer 209 assigning a client device (e.g., CPE device 204-1) to a virtual group (e.g., 201-1), the load balancer may initiate sending to the CPE device an identifier (e.g., an Internet protocol network address) for the server asset or assets (e.g., server asset 222-1, server cluster 223-1, or server cluster 223-2) associated with the virtual group. This instructs the client device to respond to user requests for certain multimedia content by requesting the content from the server asset.

In an exemplary embodiment, load balancer 209 or another network component (not depicted) may send to each CPE device 204 an indication of its virtual group assignment and server asset assignment. Sending the assignment information may occur, for example, periodically (e.g., weekly, hourly, or daily), at a certain time of day (e.g., 2 AM), in response to a timer (e.g., hourly), in response to the technical failure (e.g., a failure of server cluster 223-1), or in response to a bootup of a client device. Sending the assignment information to the client devices may be staggered in order to help prevent overloading delivery system 205 or another network component while sending the information. For example, if delivery system 205 services 50,000 CPE devices 204, then delivery system 205 or another network component may push virtual group assignment information that includes server asset identifiers to 10,000 CPE devices 204 at 1 AM, to another 10,000 CPE devices 204 at 2 AM, and so on.

Figure 3:
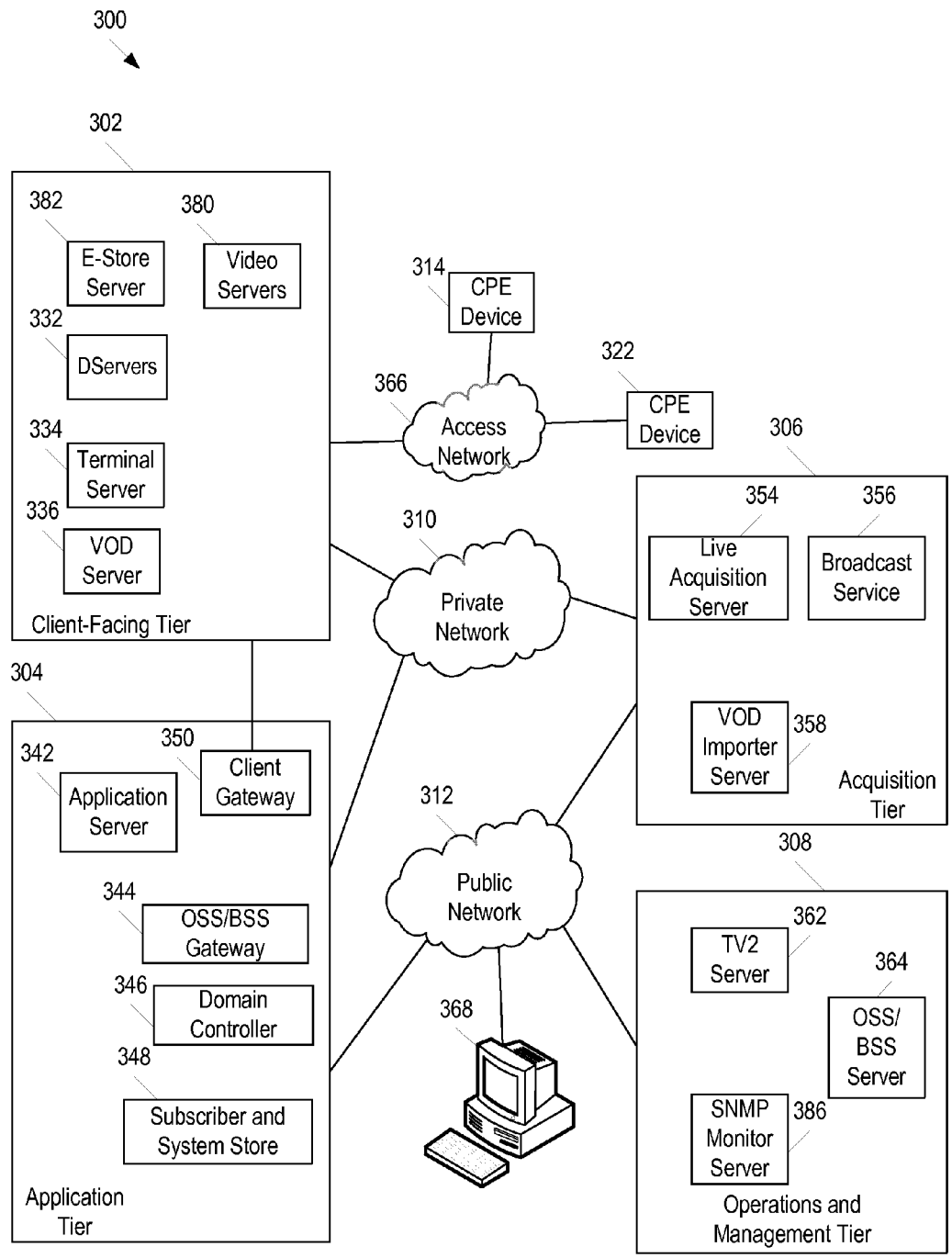
FIG. 3 is a block diagram of selected elements of an embodiment of an MCDN.

FIG. 3 illustrates selected elements of MCDN system 300 which delivers multimedia content to one or more users. It is noted that different embodiments of MCDN system 300 may include additional elements or systems (not shown in FIG. 3 for clarity) as desired for additional functionality, such as data processing systems for billing, network administration, delivery system management, content management, user support, operational support, or other applications.

As shown, system 300 can include client-facing tier 302, application tier 304, acquisition tier 306, and operations and management tier 308. Each tier 302, 304, 306, 308 is coupled to private network 310; to public network 312, such as the Internet; or to both private network 310 and public network 312. For example, client-facing tier 302 can be coupled to the private network 310. Further, application tier 304 can be coupled to private network 310 and to public network 312. Acquisition tier 306 can also be coupled to private network 310 and to public network 312. Additionally, operations and management tier 308 can be coupled to public network 312.

As illustrated in FIG. 3, the various tiers 302, 304, 306, 308 communicate with each other via private network 310 and the public network 312. For instance, client-facing tier 302 can communicate with application tier 304 and acquisition tier 306 via private network 310. Application tier 304 can communicate with acquisition tier 306 via private network 310. Further, application tier 304 can communicate with acquisition tier 306 and operations and management tier 308 via public network 312. Moreover, acquisition tier 306 can communicate with operations and management tier 308 via public network 312. In a particular embodiment, elements of application tier 304, including, but not limited to, client gateway 350, can communicate directly with client-facing tier 302.

Client-facing tier 302 can communicate with user equipment via access network 366. In an illustrative embodiment, CPE devices 314, 322 can be coupled to a local switch, router, or other device of access network 366. If CPE devices 314, 322 are for example residential gateways, client-facing tier 302 may communicate with a first representative STB device via first CPE device 314 and with a second representative STB device via second CPE device 322 (STB devices not explicitly shown in FIG. 3). In a particular embodiment, first CPE device 314 can be located at a first user premise, and second CPE device 322 can be located at a second user premise. In another particular embodiment, the first representative STB device (not depicted) and the second representative STB device (not depicted) can be located at a single user premise, both coupled to one of CPE devices 314, 322. CPE devices 314, 322 can include routers, local area network devices, modems, such as digital subscriber line (DSL) modems, any other suitable devices for facilitating communication between a STB device and access network 366, or any combination thereof.

Elements shown in FIG. 3, in some embodiments, correspond to elements shown in FIG. 1 and FIG. 2. For example, CPE device 322 and CPE device 314 in FIG. 3 correspond to CPE devices 104 in FIG. 1 and CPE devices 204 in FIG. 2. Delivery system 118 in FIG. 1 may be part of client facing tier 302 in FIG. 3. Network 106 (FIG. 1) and network 206 (FIG. 2) may correspond to or have parts in common with access network 366 in FIG. 3. Computer 368 can be a management console for managing backend services and performing disclosed systems, methods, and data processing systems. Network 206 (FIG. 2) or network 106 (FIG. 1) may correspond to or have parts in common with public network 312 (FIG. 3).

Referring to FIG. 3, in an exemplary embodiment, client-facing tier 302 can be coupled to CPE devices 314, 322 via fiber optic cables. In another exemplary embodiment, CPE devices 314, 322 can include DSL modems that are coupled to one or more network nodes via twisted pairs, and client-facing tier 302 can be coupled to the network nodes via fiber-optic cables. CPE devices 314, 322 may be configured to process data received via the access network 366, such as multimedia content provided by elements of MCDN system 300.

CPE devices 314, 322 can include MCDN issued STB devices; video gaming devices or consoles that are adapted to receive MCDN provided content; mobile phones that can operate away from a user premises; personal computers or other computing devices that are adapted to emulate STB device functionalities; any other device adapted to receive MCDN content and transmit data to an MCDN system via an access network; or any combination thereof.

In an exemplary, non-limiting embodiment, CPE devices 314, 322 can receive data, video, or any combination thereof, from client-facing tier 302 via access network 366 and render or display the data, video, or any combination thereof, at a display device, to which it is coupled. In an illustrative embodiment, CPE devices 314, 322 can include tuners that receive and decode television programming signals or packet streams for transmission to display devices, such as TV monitors. Further, CPE devices 314, 322 may include a processor and a memory device (not shown in FIG. 3) that is accessible to the processor. In one embodiment, the memory device may store executable instructions, such as embodied by a computer program.

In an illustrative embodiment, client-facing tier 302 may include a means for communicating between client-facing tier 302 and access network 366 and between client-facing tier 302 and private network 310. In one example, the communication means in client-facing tier 302 may be a network switch or sub-system (not shown in FIG. 2) that is coupled to one or more data servers, such as D-servers 332, that store, format, encode, replicate, or otherwise manipulate or prepare video content for communication from client-facing tier 302 to CPE devices 314, 322. The communication means in client-facing tier 302 can also be coupled to terminal server 334 that provides terminal devices with a point of connection to MCDN system 300 via client-facing tier 302. In a particular embodiment, communication means in client-facing tier 302 can be coupled to VOD server 336 that stores or provides VOD content imported by MCDN system 300. Further, the communication means in client-facing tier 302 may be coupled to one or more video servers 380 that receive video content and transmit the content to CPE devices 314, 322 via access network 366. The communication means in client-facing tier 302 can also be coupled to electronic store server 382 that stores and provides data related to purchasable assets to user devices, such as CPE devices 314, 322.

D-servers 332 or other server-side devices may buffer or cache portions of requested multimedia programs to help reduce latencies associated with channel changes. For example, after a request by CPE device 322 to receive linear multimedia content, D-servers 332 provide cached multimedia frames from the multimedia program to CPE device 322. In an exemplary embodiment, D-servers 332 may provide six to fifteen seconds, for example, of video before a seamless transfer to a server-side simulcast replicator or multicast replicator. For example, a seamless transfer may occur between the D-servers 332 and video servers 380 which provide access to multimedia content from live acquisition server 354. In some embodiments, the D-servers 332 include an edge device and video servers 380 provide further portions of the multimedia program to one or more client devices including CPE device 322.

In an illustrative embodiment, client-facing tier 302 can communicate with a large number of clients, such as representative CPE devices 314, 322, over a wide geographic area, such as a metropolitan area, a viewing area, a statewide area, a regional area, a nationwide area or any other suitable geographic area, market area, or subscriber or user group that can be supported by networking client-facing tier 302 to numerous CPE devices. In a particular embodiment, the communication means in client-facing tier 302, or any portion thereof, can include a multicast router or switch that communicates with multiple CPE devices via a multicast-enabled network.

As illustrated in FIG. 3, application tier 304 can communicate with both private network 310 and public network 312. Application tier 304 can include a means for communicating that can be coupled to application server 342 and to operations systems and support/billing systems and support (OSS/BSS) gateway 344. In a particular embodiment, application server 342 can provide applications to CPE devices 314, 322 via access network 366, which enable CPE devices 314, 322 to provide functions, such as interactive program guides, video gaming, display, messaging, processing of VOD material and other MCDN multimedia content, etc. In an illustrative embodiment, application server 342 can provide location information to CPE devices 314, 322. In a particular embodiment, OSS/BSS gateway 344 includes OSS data, as well as BSS data. In one embodiment, OSS/BSS gateway 344 can provide or restrict access to OSS/BSS server 364 that stores operations and billing systems data.

The means for communicating in application tier 304 can be coupled to domain controller 346 that provides Internet access, for example, to users via the public network 312. For example, domain controller 346 can provide remote Internet access to IP television (IPTV) account information, e-mail, personalized Internet services, or other online services via public network 312. In addition, the means for communicating in application tier 304 can be coupled to subscriber and system store 348 that includes account information, such as account information that is associated with users who access MCDN system 300 via private network 310 or public network 312. In an illustrative embodiment, subscriber and system store 348 can store subscriber or user data and create subscriber or user profiles that are associated with IP addresses, stock-keeping unit (SKU) numbers, other identifiers, or any combination thereof, of corresponding CPE devices 314, 322. In another illustrative embodiment, the subscriber and system store can store data associated with capabilities of STB devices associated with particular users.

In a particular embodiment, application tier 304 can include client gateway 350 that communicates data directly to client-facing tier 302. In this embodiment, client gateway 350 can be coupled directly to client-facing tier 302. Client gateway 350 can provide user access to private network 310 and other tiers coupled thereto. In an illustrative embodiment, CPE devices 314, 322 can access MCDN system 300 via access network 366, using information received from client gateway 350. User devices can access client gateway 350 via access network 366, and client gateway 350 can allow such devices to access private network 310 once the devices are authenticated or verified. Similarly, client gateway 350 can prevent unauthorized devices, such as hacker computers or stolen CPE from accessing private network 310, by denying access to these devices beyond access network 366.

For example, when a first representative CPE device 314 accesses client-facing tier 302 via access network 366, client gateway 350 can verify subscriber information by communicating with subscriber and system store 348 via private network 310. Further, client gateway 350 can verify billing information and status by communicating with OSS/BSS gateway 344 via private network 310. In one embodiment, OSS/BSS gateway 344 can transmit a query via public network 312 to OSS/BSS server 364. After client gateway 350 confirms subscriber and/or billing information, client gateway 350 can allow CPE device 314 to access MCDN content and VOD content at client-facing tier 302. If client gateway 350 cannot verify subscriber information for CPE device 314, e.g., because it is connected to an unauthorized twisted pair, client gateway 350 can block transmissions to and from CPE device 314 beyond access network 366.

In FIG. 3, acquisition tier 306 may include a means for communication (not shown in FIG. 3) with private network 310, that can also communicate with operations and management tier 308 via public network 312. In a particular embodiment, the communication means in acquisition tier 306 can be coupled to live acquisition server 354 that receives or acquires television content, movie content, advertisement content, other video content, or any combination thereof, from broadcast service 356, such as a satellite acquisition system or satellite head-end office. In a particular embodiment, live acquisition server 354 can transmit content to the communication means in acquisition tier 306, which can transmit the content to client-facing tier 302 via private network 310.

In an illustrative embodiment, multimedia content can be transmitted to D-servers 332, where it can be encoded, formatted, stored, replicated, or otherwise manipulated and prepared for communication from video server(s) 380 to CPE devices 314, 322. Client-facing tier 302 can receive content from video server(s) 380 and communicate the content to CPE 314, 322 via access network 366. STB devices can receive the content via CPE 314, 322, and can transmit multimedia content to television monitors (not shown in FIG. 3). In an illustrative embodiment, video or audio portions of the multimedia content can be streamed to CPE devices 314, 322.

Further, acquisition tier 306 can be coupled to a VOD importer server 358 that receives and stores television or movie content received at acquisition tier 306 and communicates the stored content to VOD server 336 at client-facing tier 302 via private network 310. Additionally, at acquisition tier 306, VOD importer server 358 can receive content from one or more VOD sources outside MCDN system 300, such as movie studios and programmers of non-live content. VOD importer server 358 can transmit the VOD content to acquisition tier 306, which can communicate the material to client-facing tier 302 via private network 310. The VOD content can be stored at one or more servers, such as VOD server 336.

When users issue requests for VOD content via CPE devices 314, 322, the requests can be transmitted over access network 366 to VOD server 336, via client-facing tier 302. Upon receiving such requests, VOD server 336 can retrieve the requested VOD content and transmit the content to CPE devices 314, 322 across access network 366. In an illustrative embodiment, video or audio portions of VOD content can be streamed to CPE devices 314, 322.

In FIG. 3, operations and management tier 308 can include a means for communication (not shown in FIG. 2) that conducts communication between operations and management tier 308 and public network 312. The communication means in operations and management tier 308 may be coupled to TV2 server 362. Additionally, communication means in operations and management tier 308 can be coupled to OSS/BSS server 364 and to simple network management protocol (SNMP) monitor 386 that monitors network devices within or coupled to MCDN system 300. In a particular embodiment, the communication means in operations and management tier 308 can communicate with acquisition tier 306 via public network 312.

In an illustrative embodiment, live acquisition server 354 can transmit content to acquisition tier 306, which can transmit the content to operations and management tier 308 via public network 312. In this embodiment, operations and management tier 308 can transmit the content to TV2 server 362 for display to users accessing the user interface at TV2 server 362. For example, a user can access TV2 server 362 using personal computer coupled to public network 312.

In a particular illustrative embodiment, client-facing tier 302 can provide media content, such as video content, to CPE device 314. The media content can include a selectable trigger, which may be provided by CPE device 314 to a display device as a popup within a video display. Client-facing tier 302 may receive data related to selection of the selectable trigger. In response to receiving the data, electronic store server 382 may provide a GUI including an electronic storefront to CPE device 314 for display at a display device, such as a TV monitor (not shown in FIG. 3). The electronic storefront can include data related to multiple purchasable assets as well as multiple options for purchasing one or more of the assets.

Figure 4:
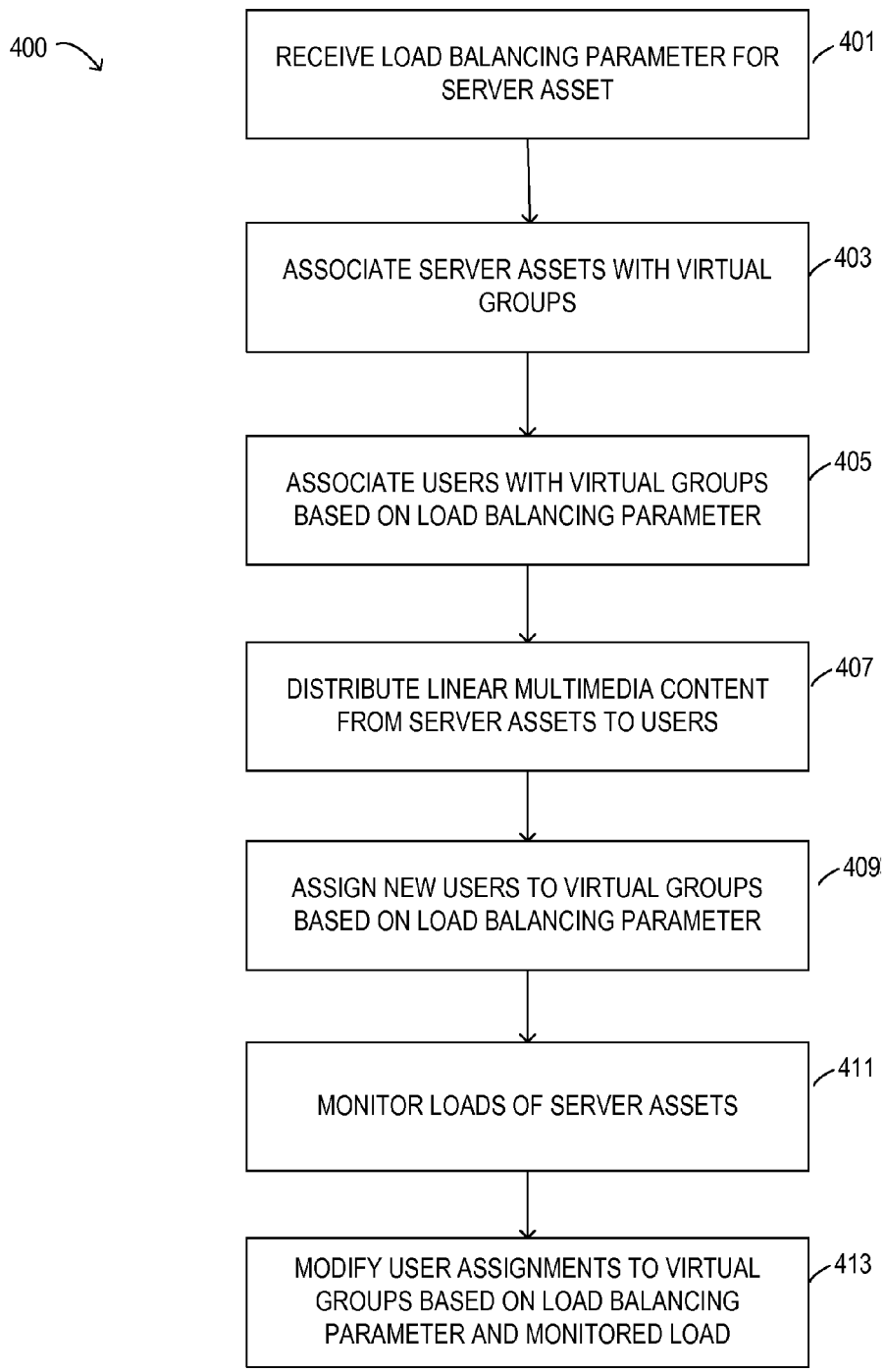
FIG. 4 is an embodiment of a method for managing multimedia content delivery.

FIG. 4 illustrates elements of an embodied method 400 for load balancing server assets used to provide linear multimedia content to users. As shown, a load-balancing parameter is received (block 401) for a server asset. The load-balancing parameter may specify an amount of requests that a server asset may process or a number of users or client devices that may be assigned to a server asset. The load-balancing parameter may specify that server assets divide an overall load equally or substantially equally. Server assets are associated (block 403) with virtual groups. Users are associated (block 405) with virtual groups based on the load-balancing parameter. Server assets distribute (block 407) linear multimedia content to users (i.e., to users' CPE devices). New users are assigned (block 409) to virtual groups based on load-balancing parameters. In accordance with some disclosed embodiments, user requests made to each server asset may be monitored (block 411). Monitoring a user request may include incrementing a counter for each user assigned to the server asset or may include measuring a quantity of content provided by or requested of each server asset. User assignments to virtual groups may be modified (block 413) based on load-balancing parameters and monitored loads.

Figure 5:
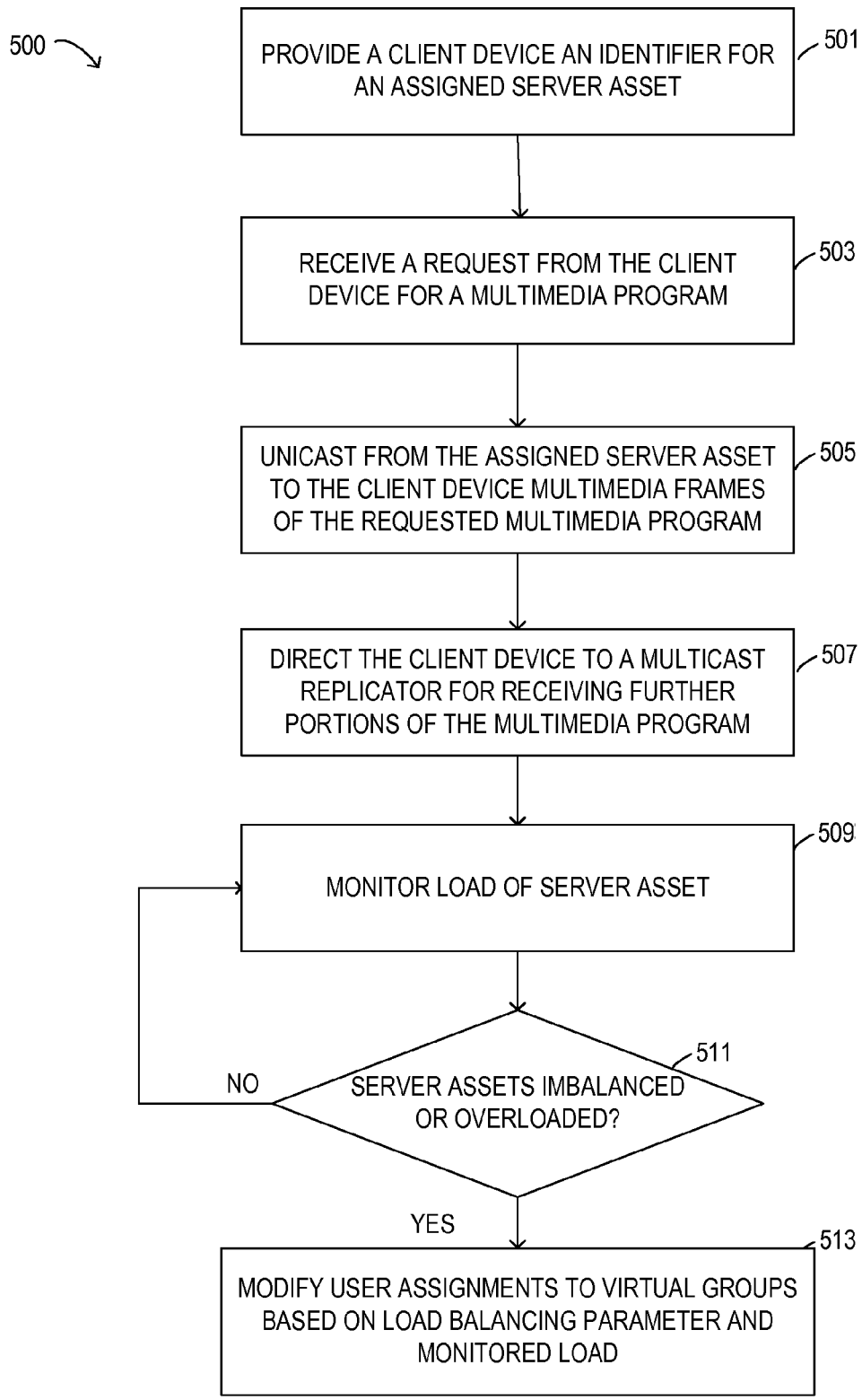
FIG. 5 is an embodiment of a method for managing multimedia content delivery.

FIG. 5 illustrates elements of an embodied method 500 for load balancing server assets. Client devices are provided (block 501) with an identifier for server assets assigned to the client devices. For example, the client device may be provided with an address to a D-server from which the client device receives linear multimedia content after a channel change. A request is received (block 503) from the client device for a multimedia program. An assigned server asset for the client device unicasts (block 505) to the client device multimedia frames of the requested multimedia program. The client device is directed (block 507) to a multicast replicator for receiving further portions of the multimedia program. The load of the server asset(s) is monitored (block 509). If the load on server assets is imbalanced (block 511) or otherwise requires modification, users are reassigned (block 513) to different virtual groups based on load-balancing parameters and monitored loads. In some disclosed methods, a substantially balanced load for each server asset may be specified and, accordingly, a software-based load balancer may reassign client devices for users to different server assets to achieve the specified balanced load.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A multimedia load management method, comprising:
    assigning a first server to a first virtual group and a second virtual group;
    assigning a client device to the first virtual group;
    monitoring loading of virtual groups including the first virtual group and the second virtual group; and
    responsive to detecting a request for a linear multimedia program from the client device:
        unicasting a first portion of the linear multimedia program to the client device from the first server; and
        multicasting a second portion of the linear multimedia program to the client device from a multicast replicator; and
    responsive to detecting unequal loading among the virtual groups, reassigning the client device to the second virtual group and to a server other than the first server in the second virtual group.

2. The method of claim 1, further comprising: iteratively reassigning the client device until loading of each virtual group is substantially equal.

3. The method of claim 1, further comprising:
    altering which particular servers are assigned to a particular virtual group without altering which particular client devices are assigned to the particular virtual group.

4. The method of claim 1, further comprising:
    caching the first portion of the linear multimedia program at the first server.

5. The method of claim 1, further comprising:
    sending a server identifier to the client device, wherein the server identifier identifies a network address of a server to which the client device is assigned; and
    responsive to the reassigning of the client device, sending an updated server identifier to the client device.

6. The method of claim 5, further comprising:
    periodically sending updated server identifiers to the client device, wherein the updated server identifiers identify a server to which the client device is currently assigned.

7. The method of claim 6, wherein periodically sending the updated server identifiers includes staggering the sending of individual updated server identifiers with respect to one another.

8. The method of claim 1, wherein said assigning comprises assigning a first client device dynamically to the first virtual group and assigning a second client device statically to the first virtual group wherein the second client device is not eligible for re-assigning to a different virtual group in response to a change in the loading.

9. A non-transitory computer readable medium including computer readable instructions that, when executed by a processor, cause the processor to perform operations including:
    assigning a first server to a first virtual group and a second virtual group;
    assigning a client device to the first virtual group;
    monitoring loading of virtual groups including the first virtual group and the second virtual group; and responsive to detecting a request for a linear multimedia program from the client device:
unicasting a first portion of the linear multimedia program to the client device from the first server; and
multicasting a second portion of the linear multimedia program to the client device from a multicast replicator; and
responsive to detecting unequal loading among the virtual groups, reassigning the client device to the second virtual group and to a server other than the first server in the second virtual group.

10. The computer readable medium of 9, wherein the operations include:
iteratively reassigning the client device until loading of each virtual group is substantially equal.

11. The computer readable medium of claim 9, wherein the operations include:
altering which particular servers are assigned to a particular virtual group without altering which particular client devices are assigned to the particular virtual group.

12. The computer readable medium of claim 9, wherein the operations include:
caching the first portion of the linear multimedia program at the first server.

13. The computer readable medium of claim 9, wherein the operations include:
sending a server identifier to the client device, wherein the server identifier identifies a network address of a server to which the client device is assigned; and
responsive to the reassigning of the client device, sending an updated server identifier to the client device.

14. The computer readable medium of claim 13, wherein the operations include:
periodically sending updated server identifiers to the client device, wherein the updated server identifiers identify a server to which the client device is currently assigned.

15. A computer system, comprising:
a processor;
non-transitory computer readable media including computer readable instructions that, when executed by a processor, cause the processor to perform operations including:
assigning a first server to a first virtual group and a second virtual group;
assigning a client device to the first virtual group;
monitoring loading of virtual groups including the first virtual group and the second virtual group; and
responsive to detecting a request for a linear multimedia program from the client device:
unicasting a first portion of the linear multimedia program to the client device from the first server; and
multicasting a second portion of the linear multimedia program to the client device from a multicast replicator; and
responsive to detecting unequal loading among the virtual groups, reassigning the client device to the second virtual group and to a server other than the first server in the second virtual group.

16. The computer system of claim 15, wherein the operations include:
iteratively reassigning the client device until loading of each virtual group is substantially equal.

17. The computer system of claim 15, wherein the operations include:
altering which particular servers are assigned to a particular virtual group without altering which particular client devices are assigned to the particular virtual group.

18. The computer system of claim 15, wherein the operations include:
caching the first portion of the linear multimedia program at the first server.

19. The computer system of claim 15, wherein the operations include:
sending a server identifier to the client device, wherein the server identifier identifies a network address of a server to which the client device is assigned; and
responsive to the reassigning of the client device, sending an updated server identifier to the client device.

20. The computer system of claim 19, wherein the operations include:
periodically sending updated server identifiers to the client device, wherein the updated server identifiers identify a server to which the client device is currently assigned.

* * * * *